(12) United States Patent
Jain et al.

(10) Patent No.: US 8,321,309 B1
(45) Date of Patent: Nov. 27, 2012

(54) METHOD AND SYSTEM FOR STREAMLINED PAYROLL SET UP AND COMPLIANT PAYCHECK GENERATION

(75) Inventors: Amit Rameshchandra Jain, Cupertino, CA (US); Timothy Hobson, Mountain View, CA (US); Elizabeth C. Douglas, Mountain View, CA (US); Nigel Tremar Menendez, Alameda, CA (US)

(73) Assignee: Intuit Inc., Mountain View, CA (US)

( * ) Notice: Subject to any disclaimer, the term of this patent is extended or adjusted under 35 U.S.C. 154(b) by 552 days.

(21) Appl. No.: 12/509,696

(22) Filed: Jul. 27, 2009

(51) Int. Cl.
*G07B 17/00* (2006.01)
(52) U.S. Cl. ............................................. 705/30; 705/32
(58) Field of Classification Search ...................... None
See application file for complete search history.

(56) References Cited

U.S. PATENT DOCUMENTS

| | | | |
|---|---|---|---|
| 6,411,938 B1 * | 6/2002 | Gates et al. | 705/30 |
| 8,082,193 B2 * | 12/2011 | Seeley et al. | 705/30 |
| 2002/0184148 A1 * | 12/2002 | Kahn et al. | 705/40 |
| 2009/0210330 A1 * | 8/2009 | Chen | 705/31 |

OTHER PUBLICATIONS

"New VersaCheck Payroll Launched to End Small Business Payroll Headaches" PR Newswire, Nov. 30, 2004, p. 1.*

* cited by examiner

*Primary Examiner* — M. Thein
(74) *Attorney, Agent, or Firm* — McKay and Hodgson, LLP; Philip McKay; Sean P. Lewis

(57) ABSTRACT

A method and system for streamlined payroll set up and compliant paycheck generation whereby a computing system implemented payroll system is provided that maintains a payroll record for each employee. In one embodiment, data indicating the minimum information required by the law to generate a compliant paycheck is obtained. When a user begins the process of generating a paycheck for a given employee, the given employee's payroll record data is analyzed and compared with the data indicating the minimum information to determine if the given employee's payroll record data includes all of the minimum information. If the given employee's payroll record data includes the minimum information, then the given employee's payroll record is marked as having the compliant paycheck data and the requested paycheck is generated. If the given employee's payroll record data does not include the minimum information, then the user is asked to provide at least enough missing data to extrapolate the minimum information and when the missing data is obtained, the given employee's payroll record is marked as having the compliant paycheck data and the requested paycheck is generated.

8 Claims, 4 Drawing Sheets

METHOD AND SYSTEM FOR STREAMLINED PAYROLL SET UP AND COMPLIANT PAYCHECK GENERATION

BACKGROUND

One of the most time consuming and labor intensive tasks faced by many businesses is the setting up, and updating of, a payroll system and/or the creation, and maintenance of, payroll records for each employee of the business.

Recently, computing system implemented payroll systems have been introduced that have standardized, and in some cases automated, some payroll features and functions, thereby representing a distinct improvement over older manual methods. However, these currently available computing system implemented payroll systems typically require the entry of large volumes of data regarding each employee and often require the user to create a comprehensive employee payroll record, all before any paycheck can be generated for an employee, and often for any employee.

Not only do currently available computing system implemented payroll systems typically require significant amounts of data entry to create a comprehensive employee payroll record before any paycheck can be generated for the employee, but many currently available computing system implemented payroll systems require the user to enter the requested data/information sequentially, and often each field must be filled in completely before the user is allowed to move on to the next data entry field and/or screen. Consequently, using many currently available computing system implemented payroll systems, if some of the information regarding an employee is currently not available, then the available data can't be entered because the user is blocked from proceeding beyond any empty data entry field.

One reason currently available computing system implemented payroll systems take this rather draconian approach to data entry is that, by law, certain information must be obtained regarding an employee before a paycheck can be generated for the employee. However, currently available computing system implemented payroll systems typically require far more information than is necessary to generate a legal, herein also referred to as a compliant, paycheck. In fact, most currently available computing system implemented payroll systems require that all data necessary to generate an "exact paycheck" of an amount calculated based on exactly correct deductions, and other variable items, be obtained before the user is allowed to generate a paycheck or run a payroll. However, all the law actually requires is a compliant paycheck, i.e., a paycheck that has been calculated to conform to the legally required deductions and other variable items. While in many instances, the "exact paycheck" is preferred, the time involved, the amount of data required, and the potential for missing data, often means that if an "exact paycheck" is required, then no paycheck can be generated at all.

The amount of data required by currently available computing system implemented payroll systems often means that numerous of data entry is required to set up a payroll for even the smallest business, and many multiples of this amount are required for larger businesses. While this is a heavy toll for all businesses, small businesses, with their often limited human resources, tend to suffer the most using currently available computing system implemented payroll systems.

As an example, using currently available computing system implemented payroll systems, the user is often to required to enter at least the following data, for each employee: the employer name; the employer address; a contact name for the employer; contact information for the employer; the employer's employer identification number; the employer state tax account number; the type of business, i.e., the employer's company structure; the employees tax filing name; year to date earnings for the employee; year to date withholdings for the employee; the employee's filing status; the employees withholdings and exemptions; the employees healthcare benefits information; the employee's retirement benefits information; the employee's vacation time; the employee's sick time; year to date earnings for the employee and/or business; the employee's pay schedule; the employee's direct deposits; the type of employee; the employee's state withholdings; the employee's SUI; the employee's work site location; information regarding the identity of the employees dependents and their contact information; the method of check distribution; and often numerous other data that varies from currently available computing system implemented payroll system-to-currently available computing system implemented payroll system.

Clearly the entry of the above data, for each employee, is a burdensome task, particularly when a paycheck, or payroll, is needed quickly. As a result, while currently available computing system implemented payroll systems are, without question, a marked improvement over older manual methods, currently available computing system implemented payroll systems still present a significant data entry burden for their users and therefore are still far from being efficient or ideal payroll systems.

SUMMARY

In accordance with one embodiment, a method and system for streamlined payroll set up and compliant paycheck generation includes a process for streamlined payroll set up and compliant paycheck generation whereby, in one embodiment, a computing system implemented payroll system is provided for creating, implementing, and maintaining a payroll record for each employee that includes payroll data associated with the employee. In one embodiment, data indicating the minimum information required by the law to generate a compliant paycheck for an employee is obtained, and updated as needed. In one embodiment, when a user attempts to generate a paycheck for a given employee, or run a payroll, the given employee's payroll record data is analyzed/compared with the data indicating the minimum information required by the law to generate a compliant paycheck to determine if the given employee's payroll record data includes all of the minimum information required by the law to generate a compliant paycheck, or, in one embodiment, if the given employee's payroll record data includes at least enough data for the process for streamlined payroll set up and compliant paycheck generation to extrapolate, or fill-in, the minimum information required by the law to generate a compliant paycheck. In one embodiment, if the given employee's payroll record data includes the minimum information required by the law to generate a compliant paycheck, or enough data to extrapolate the minimum information required by the law to generate a compliant paycheck, then the given employee's payroll record is marked as having sufficient compliant paycheck data and the requested paycheck is generated. In one embodiment, if the given employee's payroll record data does not include the minimum information required by the law to generate a compliant paycheck, or enough data to extrapolate the minimum information required by the law to generate a compliant paycheck, then the user is asked to provide at least enough missing data for the process for streamlined payroll set up and compliant paycheck generation to extrapolate the minimum information required by the law to generate a compliant paycheck. In one embodiment, when the missing data is obtained, the missing data is added to the employee's payroll record in the computing system implemented payroll system and the given employee's payroll record is marked as having the compliant paycheck data. The requested paycheck is then generated through the computing system implemented payroll system.

In one embodiment, a computing system implemented payroll system is provided that is a parent system for, is accessible by, or is otherwise associated with, the process for streamlined payroll set up and compliant paycheck generation. In one embodiment, the computing system implemented payroll system maintains a payroll record for each employee in the form of a data file that includes all currently available payroll data associated with the employee.

In one embodiment, the computing system implemented payroll system provided allows a user to create and operate a payroll system for paying employees and for processing and generating regular paychecks, and/or special payment checks, for employees via any computing system, as discussed herein, and/or as known in the art at the time of filing, and/or as developed at the time of filing. One example of a computing system implemented payroll system is Quick-Books, available from Intuit Inc. of Mountain View, Calif., however, other computing system implemented payroll systems are available and, in various embodiments, any computing system implemented payroll system is provided as discussed herein, and/or as known in the art at the time of filing, and/or as developed at the time of filing.

In one embodiment, data indicating the minimum information required by the law to generate a compliant paycheck for an employee is obtained, and updated as needed, from a Federal, state, and/or local government agency, such as the Internal Revenue Service. In one embodiment, data indicating the minimum information required by the law to generate a compliant paycheck for an employee is obtained, and updated as needed, from a Federal, state, and/or local government agency in "hardcopy" and data representing the hardcopy information is entered into a computing system, database, or memory that is part of, under the control of, accessible by, or otherwise associated with the process for streamlined payroll set up and compliant paycheck generation.

In one embodiment, data indicating the minimum information required by the law to generate a compliant paycheck for an employee is obtained, and updated as needed, from a Federal, state, and/or local government agency website. In one embodiment, data indicating the minimum information required by the law to generate a compliant paycheck for an employee is obtained, and updated as needed, from a Federal, state, and/or local government agency website using screen scraping, or a similar technology. In one embodiment, data indicating the minimum information required by the law to generate a compliant paycheck for an employee is obtained, and updated as needed, from a from a Federal, state, and/or local government via a computer program product, and/or other form/mechanism of data transfer.

In one embodiment, data indicating the minimum information required by the law to generate a compliant paycheck for an employee is obtained, and updated as needed, from a third party. In one embodiment, data indicating the minimum information required by the law to generate a compliant paycheck for an employee is obtained, and updated as needed, from a third party in "hardcopy" and data representing the hardcopy information is entered into a computing system, database, or memory that is part of, under the control of, accessible by, or otherwise associated with, the process for streamlined payroll set up and compliant paycheck generation.

In one embodiment, data indicating the minimum information required by the law to generate a compliant paycheck for an employee is obtained, and updated as needed, from a third party website. In one embodiment, data indicating the minimum information required by the law to generate a compliant paycheck for an employee is obtained, and updated as needed, from a third party website using screen scraping, or a similar technology. In one embodiment, data indicating the minimum information required by the law to generate a compliant paycheck for an employee is obtained, and updated as needed, from a third party via a computer program product.

In one embodiment, data indicating the minimum information required by the law to generate a compliant paycheck for an employee is obtained, and updated as needed, from a computing system implemented tax preparation system. In one embodiment, data indicating the minimum information required by the law to generate a compliant paycheck for an employee is obtained, and updated as needed, from a computing system implemented tax preparation system as electronic data and the data is transferred, or otherwise entered, into a computing system, database, or memory that is part of, under the control of, accessible by, or otherwise associated with the process for streamlined payroll set up and compliant paycheck generation.

In one embodiment, data indicating the minimum information required by the law to generate a compliant paycheck for an employee is obtained, and updated as needed, a from a computing system implemented tax preparation system via a computer program product, and/or other form/mechanism of data transfer.

In one embodiment, data indicating the minimum information required by the law to generate a compliant paycheck for an employee is obtained, and updated as needed, from a computing system implemented accounting system. In one embodiment, data indicating the minimum information required by the law to generate a compliant paycheck for an employee is obtained, and updated as needed, from a computing system implemented accounting system as electronic data and the data is transferred, or otherwise entered, into a computing system, database, or memory that is part of, under the control of, accessible by, or otherwise associated with the process for streamlined payroll set up and compliant paycheck generation.

In one embodiment, data indicating the minimum information required by the law to generate a compliant paycheck for an employee is obtained, and updated as needed, a from a computing system implemented accounting system via a computer program product, and/or other form/mechanism of data transfer.

In one embodiment, data indicating the minimum information required by the law to generate a compliant paycheck for an employee is obtained, and updated as needed, from any source of the data, as discussed herein, and/or as known at the time of filing, and/or as developed after the time of filing, by any means of data acquisition and/or data transfer as discussed herein, and/or as known at the time of filing, and/or as developed after the time of filing.

In one embodiment, the obtained data indicating the minimum information required by the law to generate a compliant paycheck for an employee is stored by any means of storing data as discussed herein, and/or as known at the time of filing, and/or as developed after the time of filing.

In one embodiment, when an employer, an employee of the employer, or an agent for the employer, all of which are also referred to herein as a "user", attempts to generate a paycheck for a given employee using the process for streamlined payroll set up and compliant paycheck generation, the given employee's payroll record data is obtained from the computing system implemented payroll system and one or more processors associated with a computing system analyze and/or compares the given employee's payroll record data with the data indicating the minimum information required by the law to generate a compliant paycheck.

In one embodiment, the analysis and/or comparison is performed to determine if the given employee's payroll record data includes all of the minimum information required by the law to generate a compliant paycheck. In one embodiment, the analysis and/or comparison is performed to determine if the given employee's payroll record data includes at least enough data for the process for streamlined payroll set up and compliant paycheck generation to extrapolate and/or otherwise fill-in, the minimum information required by the law to generate a compliant paycheck.

For instance, in some embodiments, as little information as the employee's name, the employee's SSN or other tax identifier, the employee's state/city of residence, the employee's working location state/city, and the employee's wage type, i.e., salary, hourly etc., is all the information that is needed to generate a compliant paycheck. In one embodiment, the process for streamlined payroll set up and compliant paycheck generation searches for, analyzes, compares, and requires, only the minimum data necessary to perform the task at hand, in this instance, to generate a compliant paycheck. As discussed in more detail below, using the process for streamlined payroll set up and compliant paycheck generation, any other information/data can be provided at the user's discretion, as the information becomes available, and/or as time permits, and/or in any order, or priority, the user desires.

In one embodiment, if the given employee's payroll record data includes the minimum information required by the law to generate a compliant paycheck, or enough data to extrapolate the minimum information required by the law to generate a compliant paycheck, then the given employee's payroll record is marked as having sufficient compliant paycheck data and the requested paycheck is generated. As noted above, using the process for streamlined payroll set up and compliant paycheck generation, any employee information/data other than the minimum information required by the law to generate a compliant paycheck, or enough data to extrapolate the minimum information required by the law to generate a compliant paycheck, can be provided at the user's discretion, as the information becomes available, and/or as time permits, and/or in any order, or priority, the user desires.

In one embodiment, if, on the other hand, the given employee's payroll record data does not include the minimum information required by the law to generate a compliant paycheck, or enough data to extrapolate the minimum information required by the law to generate a compliant paycheck, then the user is asked to provide the minimum required information and/or at least enough missing data for the process for streamlined payroll set up and compliant paycheck generation to extrapolate the minimum information required by the law to generate a compliant paycheck.

In one embodiment, the user is asked to provide the minimum required information, and/or at least enough missing data for the process for streamlined payroll set up and compliant paycheck generation to extrapolate the minimum information required by the law to generate a compliant paycheck, via a user interface screen on a display device associated with a computing system. In one embodiment, the user is asked to provide the minimum required information, and/or at least enough missing data for the process for streamlined payroll set up and compliant paycheck generation to extrapolate the minimum information required by the law to generate a compliant paycheck, using a user interface device such as, but not limited to, a keyboard, a mouse, a touchpad, voice recognition software, or any other device and/or system capable of providing user input to a computing system and/or for translating user actions into computing system operations, whether available or known at the time of filing or as developed later.

As discussed in more detail below, using the process for streamlined payroll set up and compliant paycheck generation, only the minimum information required by the law to generate a compliant paycheck is requested and/or required. In addition, in one embodiment, the minimum information required by the law to generate a compliant paycheck is requested only when the data is actually needed. In addition, in one embodiment of the process for streamlined payroll set up and compliant paycheck generation, the minimum information required by the law to generate a compliant paycheck can be provided by the user in any order, or priority, the user desires. In addition, as noted above, any employee information/data other than the minimum information required by the law to generate a compliant paycheck, or enough data to extrapolate the minimum information required by the law to generate a compliant paycheck, can be provided at the user's discretion, as the information becomes available, and/or as time permits, and/or in any order, or priority, the user desires.

In one embodiment, when the missing data is obtained, the missing data is added to the given employee's payroll record/file in the computing system implemented payroll system and the given employee's payroll record/file in the computing system implemented payroll system is marked as having the compliant paycheck data.

In one embodiment, when the missing data is obtained, the requested paycheck is generated.

In one embodiment, the process discussed above is repeated for each employee in order to "run a payroll", i.e., to prepare regular paychecks for all the employees.

In one embodiment, the process discussed above is repeated for each employee in order to "set up a payroll", i.e., to obtain the necessary data in order to run a payroll and/or generally set-up an operating payroll system.

Using embodiments of the method and system for streamlined payroll set up and compliant paycheck generation disclosed herein, only the minimum information required by the law to generate a compliant paycheck is requested of a user and required in order for the user to generate a paycheck and/or run a payroll. In addition, using embodiments of the method and system for streamlined payroll set up and compliant paycheck generation disclosed herein, the minimum information required by the law to generate a compliant paycheck is requested only when the data is actually needed. In addition, using embodiments of the method and system for streamlined payroll set up and compliant paycheck generation disclosed herein, the minimum information required by the law to generate a compliant paycheck can be provided by the user in any order, or priority, the user desires. In addition, using embodiments of the method and system for streamlined payroll set up and compliant paycheck generation disclosed herein, any employee information/data other than the minimum information required by the law to generate a compliant paycheck, or enough data to extrapolate the minimum information required by the law to generate a compliant paycheck, can be provided at the user's discretion, as the information becomes available, and/or as time permits, and/or in any order, or priority, the user desires. Consequently, using embodiments of the method and system for streamlined payroll set up and compliant paycheck generation disclosed herein, a user can generate a legally compliant paycheck, and run a legally compliant payroll, without the unnecessary data entry burden, and corresponding time delay, required by currently available computing system implemented payroll systems. Therefore, using embodiments of the method and system for streamlined payroll set up and compliant paycheck generation disclosed herein, paychecks can be generated, employee's can get paid, and payrolls can be set up, in minimum time and with minimum effort.

In addition, using embodiments of the method and system for streamlined payroll set up and compliant paycheck generation disclosed herein, when time does permit, and/or the information becomes available, the more detailed information can be entered in any order, or priority, the user desires, and then "exact paychecks" of amounts calculated based on exactly correct deductions and other variable items, rather than a compliant paycheck that has been calculated to conform to the legally required deductions and other variable items, can be generated using the method and system for streamlined payroll set up and compliant paycheck generation disclosed herein.

As discussed in more detail below, using the below embodiments, with little or no modification and/or user input, there is considerable flexibility, adaptability, and opportunity for customization to meet the specific needs of various users under numerous circumstances.

Figure 1:
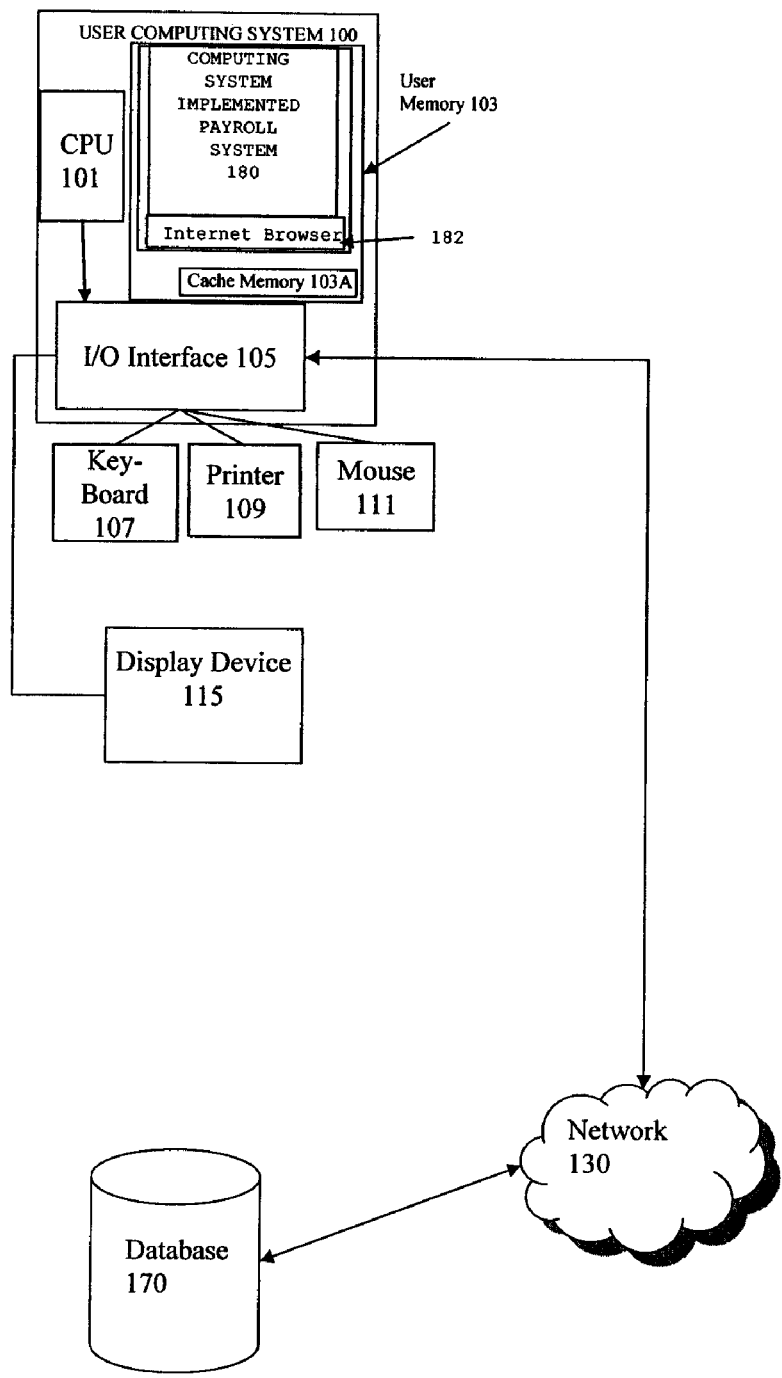
FIG. 1 is a block diagram of an exemplary hardware architecture for implementing one embodiment including a user computing system, a provider computing system, a data source computing system, a database, and a network.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for streamlined payroll set up and compliant paycheck generation includes a process for streamlined payroll set up and compliant paycheck generation whereby, in one embodiment, a computing system implemented payroll system is provided for creating, implementing, and maintaining a payroll record for each employee that includes payroll data associated with the employee. In one embodiment, data indicating the minimum information required by the law to generate a compliant paycheck for an employee is obtained, and updated as needed. In one embodiment, when a user attempts to generate a paycheck for a given employee, or run a payroll, the given employee's payroll record data is analyzed/compared with the data indicating the minimum information required by the law to generate a compliant paycheck to determine if the given employee's payroll record data includes all of the minimum information required by the law to generate a compliant paycheck, or, in one embodiment, if the given employee's payroll record data includes at least enough data for the process for streamlined payroll set up and compliant paycheck generation to extrapolate, or fill-in, the minimum information required by the law to generate a compliant paycheck. In one embodiment, if the given employee's payroll record data includes the minimum information required by the law to generate a compliant paycheck, or enough data to extrapolate the minimum information required by the law to generate a compliant paycheck, then the given employee's payroll record is marked as having sufficient compliant paycheck data and the requested paycheck is generated. In one embodiment, if the given employee's payroll record data does not include the minimum information required by the law to generate a compliant paycheck, or enough data to extrapolate the minimum information required by the law to generate a compliant paycheck, then the user is asked to provide at least enough missing data for the process for streamlined payroll set up and compliant paycheck generation to extrapolate the minimum information required by the law to generate a compliant paycheck. In one embodiment, when the missing data is obtained, the missing data is added to the employee's payroll record in the computing system implemented payroll system and the given employee's payroll record is marked as having the compliant paycheck data. The requested paycheck is then generated through the computing system implemented payroll system.

FIG. 1 is a block diagram of an exemplary hardware architecture for implementing one embodiment of a system and method for streamlined payroll set up and compliant paycheck generation, such as exemplary process 300 (FIG. 3) discussed herein, that, returning to FIG. 1, includes: a user computing system 100, e.g., a first computing system; and a database 170; operatively coupled by a network 130.

As seen in FIG. 1, user computing system 100 typically includes one or more central processing units, CPU(s) 101, an input/output (I/O) interface 105, and a user memory 103, including cache memory 103A. As discussed in more detail below, in one embodiment, user memory 103 includes all, or part, of a computing system implemented payroll system 180 and/or instructions and data associated with a process for streamlined payroll set up and compliant paycheck generation 300 (see FIG. 3).

Returning to FIG. 1, user computing system 100 may further include standard user interface devices such as a keyboard 107, a mouse 111, a printer 109, and a display device 115, as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

In one embodiment, user computing system 100 also includes an Internet browser capability 182 that, in one embodiment, includes a search engine (not shown) and is stored, in whole, or in part, in user memory 103.

In one embodiment, user computing system 100 is a computing system accessible by one or more users who are employers, employees of the employers, and/or agents for the employers. In one embodiment, user computing system 100 is used, and/or accessible, by another computing system.

In one embodiment, user computing system 100 is representative of multiple user computing systems. In one embodiment, user computing system 100 is representative of a webpage, or web-based system. In one embodiment, user computing system 100 is a server computing system. In various embodiments, user computing system 100 is any computing system as defined herein and/or as known in the art at the time of filing and/or as developed thereafter, that includes components that can execute all, or part, of a process for streamlined payroll set up and compliant paycheck generation in accordance with at least one of the embodiments as described herein.

Also shown in FIG. 1 is database 170. In one embodiment, database 170 is a data storage device, a designated server system or computing system, or a designated portion of one or more server systems or computing systems, such as computing system 100, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for streamlined payroll set up and compliant paycheck generation and/or a computing system implemented payroll system, such as computing system implemented payroll system 180.

In one embodiment, data associated with one or more Federal, state and/or local government laws and/or Federal, state and/or local government requirements for generating a compliant paycheck and/or compliant payroll is stored, in whole, or in part, in database 170, and is used by, or is accessed by, a process for streamlined payroll set up and compliant paycheck generation.

In one embodiment, data associated with a process for streamlined payroll set up and compliant paycheck generation, is stored, in whole, or in part, in database 170, and is used by, or is accessed by, a process for streamlined payroll set up and compliant paycheck generation.

In one embodiment, data associated with a computing system implemented payroll system, such as computing system implemented payroll system 180, is stored, in whole, or in part, in database 170, and is used by, or is accessed by, a process for streamlined payroll set up and compliant paycheck generation.

In one embodiment, database 170 is accessible by one or more users. In one embodiment, database 170 is used, and/or accessible, by a computing system, such as computing system 100.

In one embodiment, computing system 100 and database 170 are communicably coupled through network 130. Network 130 can be any network or network system as defined herein, and/or known in the art at the time of filing, and/or as developed after the time of filing, capable of allowing communication between two or more computing systems, server systems, and/or databases.

In one embodiment, computing system 100, database 170, and network 130 are part of a cloud computing environment.

Those of skill in the art will readily recognize that the components shown in FIG. 1, such as computing system 100 and database 170, and their respective components, are shown for illustrative purposes only and that architectures with more or fewer components can implement, and benefit from, one or more embodiments. Moreover, one or more components of user computing system 100 and database 170, may be located remotely from their respective system and accessed via network 130. In addition, the particular type of, and configuration of, computing system 100 is not relevant.

As discussed above, in one embodiment, at least part of a computing system implemented payroll system, such as computing system implemented payroll system 180, and/or data and instructions associated with at least part of a process for streamlined payroll set up and compliant paycheck generation is stored, in whole, or in part, in user memory 103 of user computing system 100.

Figure 2:
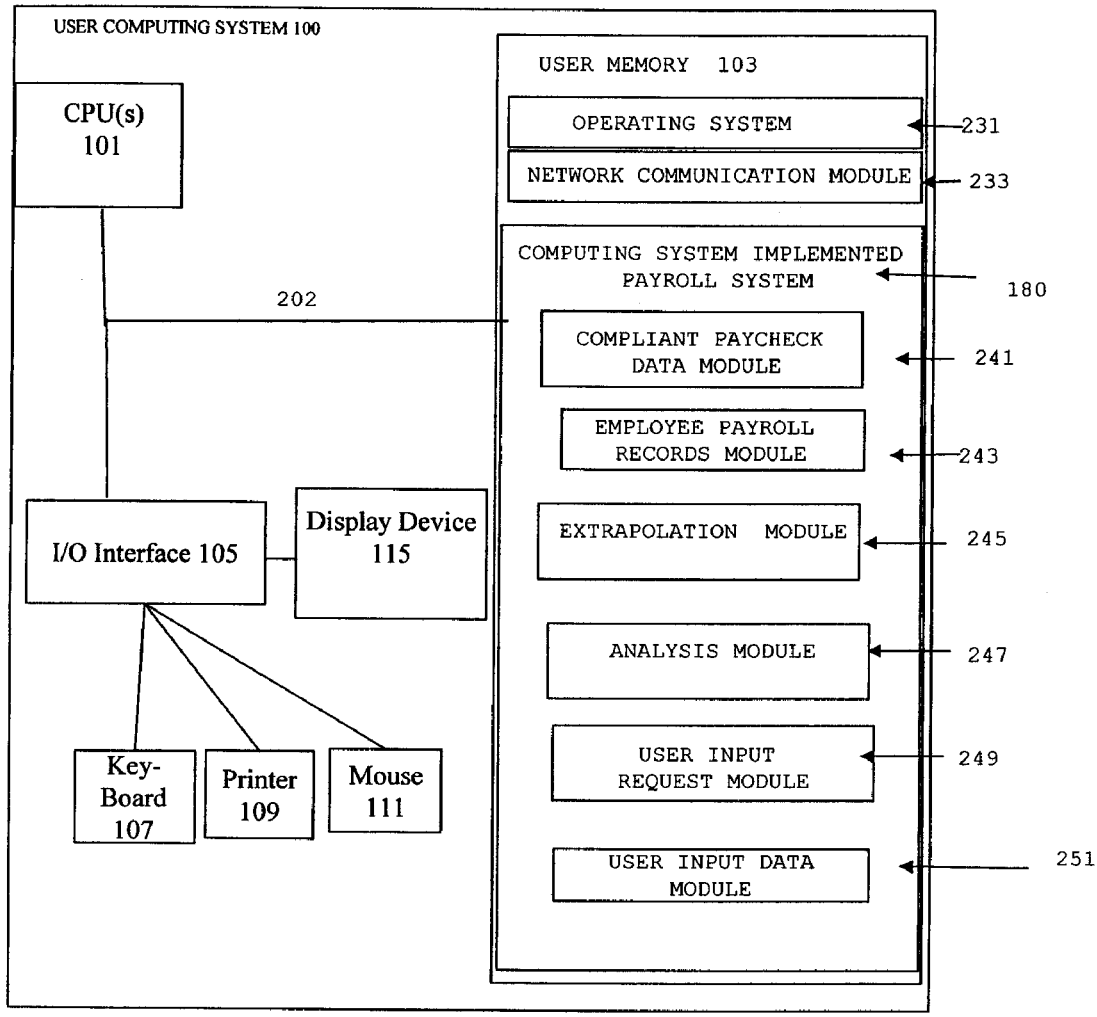
FIG. 2 is a block diagram showing more detail of an exemplary user computing system in accordance with one embodiment.

FIG. 2 is a more detailed block diagram of an exemplary user computing system 100 (FIG. 1). As seen in FIG. 2, in one embodiment, user computing system 100 includes one of more Central Processing Unit(s), CPU(s) 101; user memory 103; an Input/Output interface, I/O interface 105, including one or more user interface devices such as display device 115, keyboard 107, printer 109, and/or mouse 111; all interconnected by one or more communication buses 202.

As also seen in FIG. 2, in one embodiment, user memory 103 can store data and/or instructions associated with, but not limited to, the following elements, subsets of elements, and/ or super sets of elements for processing by one or more processors, such as CPU(s) 101 (FIG. 2): operating system 231 that includes procedures, data, and/or instructions for handling various services and performing/coordinating hardware dependent tasks; network communications module 233 that includes procedures, data, and/or instructions, for connecting user computing system 100 to other computing systems, such as other user computing systems 100, and/or a network, such as network 130 of FIG. 1, and/or a database, such as database 170 of FIG. 1; and computing system implemented payroll system 180 (FIG. 2) that includes procedures, data, and/or instructions, for creating, operating, and maintaining a computing system implemented payroll and implementing at least part of a process for streamlined payroll set up and compliant paycheck generation.

As also seen in FIG. 2, in one embodiment, computing system implemented payroll system 180 of user memory 103 includes: compliant paycheck data module that include procedures, data, and/or instructions for obtaining and/or storing one or more Federal, state and/or local government laws and/or Federal, state and/or local government requirements for generating a compliant paycheck and/or compliant payroll; employee payroll records module 243 that includes procedures, data, and/or instructions for creating, maintaining and storing employee payroll records including data files that includes all currently available payroll data associated with each employee; extrapolation module 245 that includes procedures, data, and/or instructions for extrapolating and/or otherwise filling-in, the minimum information required by the law to generate a compliant paycheck of compliant paycheck data module 241 from employee payroll records module 243; analysis module 247 that includes procedures, data, and/or instructions, for one or more processors associated with a computing system, such as CPU(s) 101 of computing system 100, to analyze and/or compare the given employee's payroll record data from employee payroll records module 243 with the data indicating the minimum information required by the law to generate a compliant paycheck of compliant paycheck data module 241; user input request module 249 that includes procedures, data, and/or instructions for requesting the user to provide the minimum required information, and/or at least enough missing data to extrapolate the minimum information required by the law to generate a compliant paycheck; and user input data module that includes procedures, data, and/or instructions for receiving, storing and processing missing data representing the minimum information required by the law to generate a compliant paycheck from the user.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 and discussed herein do not limit the scope as claimed below.

A more detailed discussion of the operation of exemplary user computing system 100, user memory 103, and computing system implemented payroll system 180 of user memory 103, is provided below with respect to FIG. 3.

Process

Herein, the term "user", includes, but is not limited to any person, party, business, system, application, organization, and/or entity interacting with, interfacing with, contacting, viewing, providing data to, accepting data from, requesting data from, and/or otherwise associating with the process for streamlined payroll set up and compliant paycheck generation for any purpose. For instance, in some embodiments, the user is the employer, employees of the employer, and/or any agents of the employer, interacting with, interfacing with, contacting, viewing, providing data to, accepting data from, requesting data from, and/or otherwise associating with the process for streamlined payroll set up and compliant paycheck generation for any purpose.

As used herein, the term "computing system implemented payroll system" includes any systems, packages, programs, modules, or applications that are used to create, implement, and/or maintain a payroll record for employees in the form of a data file. In one embodiment, a computing system implemented payroll system provided allows a user to create and operate a payroll system for paying employees and for processing and generating regular paychecks, and/or special payment checks, for employees via a computing system. One example of a computing system implemented payroll system is QuickBooks, available from Intuit Inc. of Mountain View, Calif., however, other computing system implemented payroll systems are available and, in various embodiments, any computing system implemented payroll system is provided as discussed herein, and/or as known in the art at the time of filing, and/or as developed at the time of filing.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented accounting and/or invoicing systems, packages, programs, modules, or applications; computing system implemented financial management systems, packages, programs, modules, or applications; computing system implemented financial management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term computing system implemented financial management system includes, but is not limited to: computing system implemented personal and/or business financial management systems, packages, programs, modules, or applications; computing system implemented personal and/or business tax preparation systems, packages, programs, modules, or applications; computing system implemented personal and/or business accounting and/or invoicing systems, packages, programs, modules, or applications; and various other personal and/or business electronic data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for streamlined payroll set up and compliant paycheck generation includes a process for streamlined payroll set up and compliant paycheck generation whereby, in one embodiment, a computing system implemented payroll system is provided for creating, implementing, and maintaining a payroll record for each employee that includes payroll data associated with the employee. In one embodiment, data indicating the minimum information required by the law to generate a compliant paycheck for an employee is obtained, and updated as needed. In one embodiment, when a user attempts to generate a paycheck for a given employee, or run a payroll, the given employee's payroll record data is analyzed/compared with the data indicating the minimum information required by the law to generate a compliant paycheck to determine if the given employee's payroll record data includes all of the minimum information required by the law to generate a compliant paycheck, or, in one embodiment, if the given employee's payroll record data includes at least enough data for the process for streamlined payroll set up and compliant paycheck generation to extrapolate, or fill-in, the minimum information required by the law to generate a compliant paycheck. In one embodiment, if the given employee's payroll record data includes the minimum information required by the law to generate a compliant paycheck, or enough data to extrapolate the minimum information required by the law to generate a compliant paycheck, then the given employee's payroll record is marked as having sufficient compliant paycheck data and the requested paycheck is generated. In one embodiment, if the given employee's payroll record data does not include the minimum information required by the law to generate a compliant paycheck, or enough data to extrapolate the minimum information required by the law to generate a compliant paycheck, then the user is asked to provide at least enough missing data for the process for streamlined payroll set up and compliant paycheck generation to extrapolate the minimum information required by the law to generate a compliant paycheck. In one embodiment, when the missing data is obtained, the missing data is added to the employee's payroll record in the computing system implemented payroll system and the given employee's payroll record is marked as having the compliant paycheck data. The requested paycheck is then generated through the computing system implemented payroll system.

Figure 3:
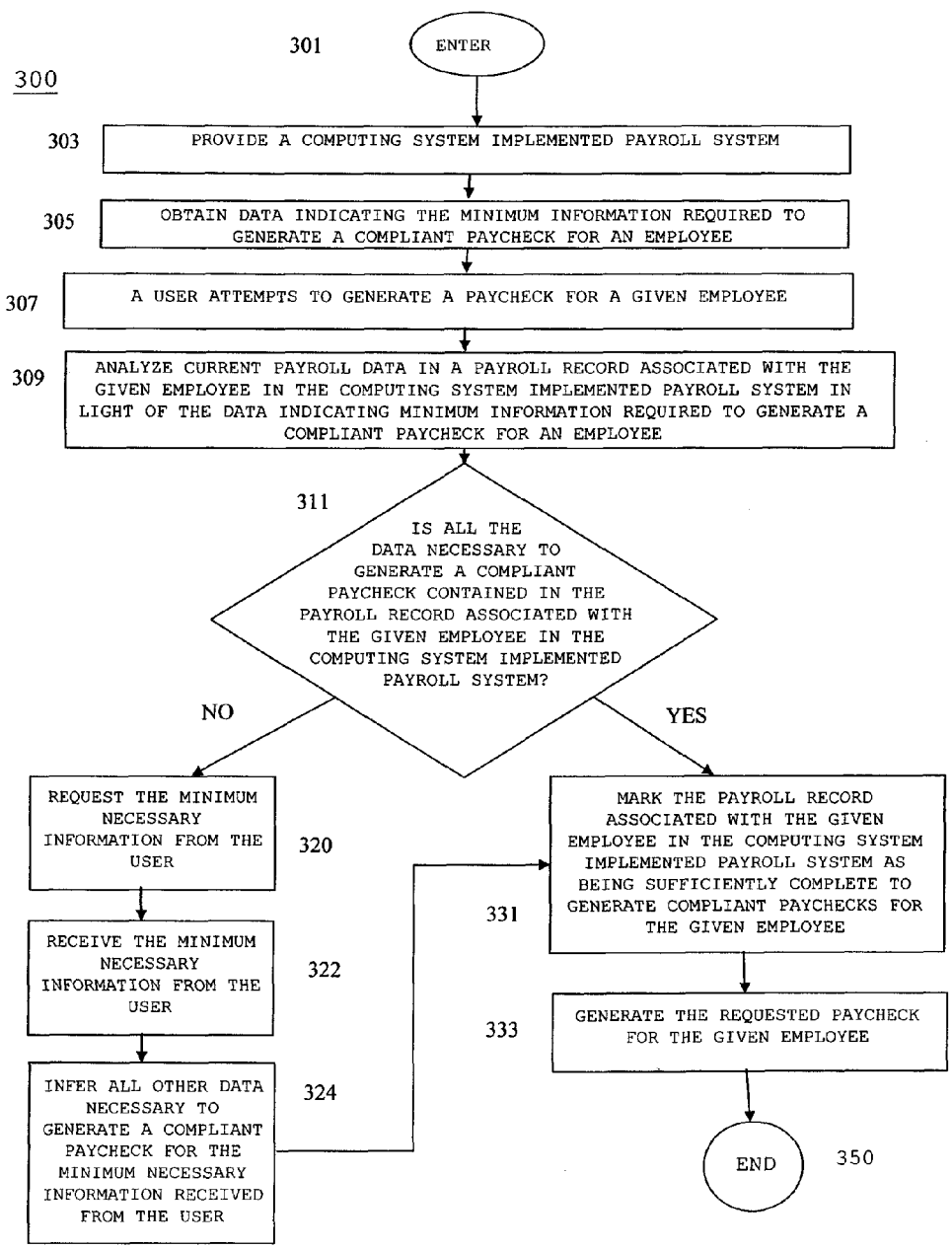
FIG. 3 is an exemplary flow chart illustrating one embodiment of a process for streamlined payroll set up and compliant paycheck generation.

FIG. 3 is a flow chart depicting a process for streamlined payroll set up and compliant paycheck generation 300 in accordance with one embodiment. Process for streamlined payroll set up and compliant paycheck generation 300 begins at ENTER OPERATION 301 of FIG. 3 and process flow proceeds to PROVIDE A COMPUTING SYSTEM IMPLEMENTED PAYROLL SYSTEM OPERATION 303.

In one embodiment, at PROVIDE A COMPUTING SYSTEM IMPLEMENTED PAYROLL SYSTEM OPERATION 303 a computing system implemented payroll system is provided for creating, implementing, and maintaining a payroll record for each employee of an employer that includes payroll data associated with each employee.

In one embodiment, at PROVIDE A COMPUTING SYSTEM IMPLEMENTED PAYROLL SYSTEM OPERATION 303 a computing system implemented payroll system, such as computing system implemented payroll system 180 of FIGS. 1 and 2, is provided that is a parent system for, is accessible by, or is otherwise associated with, process for streamlined payroll set up and compliant paycheck generation 300 (FIG. 3). In one embodiment, the computing system implemented payroll system maintains a payroll record for each employee in the form of a data file that includes all currently available payroll data associated with the employee.

In one embodiment, the computing system implemented payroll system provided at PROVIDE A COMPUTING SYSTEM IMPLEMENTED PAYROLL SYSTEM OPERATION 303 allows a user to create and operate a payroll system for paying employees and for processing and generating regular paychecks, and/or special payment checks, for employees via a computing system, such a user computing system 100 of FIGS. 1 and 2. One example of a computing system implemented payroll system is QuickBooks, available from Intuit Inc. of Mountain View, Calif., however, other computing system implemented payroll systems are available and, in various embodiments, any computing system implemented payroll system is provided at PROVIDE A COMPUTING SYSTEM IMPLEMENTED PAYROLL SYSTEM OPERATION 303 as discussed herein, and/or as known in the art at the time of filing, and/or as developed at the time of filing.

In one embodiment, once a computing system implemented payroll system is provided for creating, implementing, and maintaining a payroll record for each employee that includes payroll data associated with each employee at PROVIDE A COMPUTING SYSTEM IMPLEMENTED PAYROLL SYSTEM OPERATION 303, process flow proceeds to OBTAIN DATA INDICATING THE MINIMUM INFORMATION REQUIRED TO GENERATE A COMPLIANT PAYCHECK FOR AN EMPLOYEE OPERATION 305.

In one embodiment, at OBTAIN DATA INDICATING THE MINIMUM INFORMATION REQUIRED TO GENERATE A COMPLIANT PAYCHECK FOR AN EMPLOYEE OPERATION 305 data indicating the minimum information required by the law to generate a compliant paycheck for an employee is determined, and/or obtained, stored, and updated as needed.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a Federal, state, and/or local government agency, such as the Internal Revenue Service.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a Federal, state, and/or local government agency in "hardcopy" and data representing the hardcopy information is entered into one or more of: a computing system, such as user computing system 100 of FIGS. 1 and 2; a database, such as database 170 of FIG. 1; or memory, such as user memory 103 of FIGS. 1 and 2, that is part of, under the control of, accessible by, or otherwise associated with process for streamlined payroll set up and compliant paycheck generation 300. In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a Federal, state, and/or local government agency by scanning the data into a computing system, database, or memory, from a hardcopy document containing the minimum information required by the law to generate a compliant paycheck for an employee.

In one embodiment, at OBTAIN DATA INDICATING THE MINIMUM INFORMATION REQUIRED TO GENERATE A COMPLIANT PAYCHECK FOR AN EMPLOYEE OPERATION 305, the data indicating the minimum information required by the law to generate a compliant paycheck for an employee is obtained, and updated as needed, from a Federal, state, and/or local government agency website. In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a Federal, State, and/or local government agency website using screen scraping, or a similar technology.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a from a Federal, state, and/or local government via a computer program product, and/or other form/mechanism of data transfer.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a third party, such as a tax preparer, a consultant, an accountant, or any other third party having access to the desired information and/or data indicating the minimum information required by the law to generate a compliant paycheck for an employee.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a third party in "hardcopy" and data representing the hardcopy information is entered into a computing system, database, or memory that is part of, under the control of, accessible by, or otherwise associated with, the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a third party website. In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a third party website using screen scraping, or a similar technology.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a third party via a computer program product.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented data management system, as discussed herein, and/or as known in the art at the time of filing, and/or as developed after the time of filing.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented data management system in "hardcopy" and data representing the hardcopy information is entered into a computing system, database, or memory that is part of, under the control of, accessible by, or otherwise associated with, the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented data management system as electronic data and the data is transferred, or otherwise entered, into a computing system, database, or memory that is part of, under the control of, accessible by, or otherwise associated with the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented data management system via a computer program product, and/or other form/mechanism of data transfer.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented financial management system, as discussed herein, and/or as known in the art at the time of filing, and/or as developed after the time of filing.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented financial management system in "hardcopy" and data representing the hardcopy information is entered into a computing system, database, or memory that is part of, under the control of, accessible by, or otherwise associated with, the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented financial management system as electronic data and the data is transferred, or otherwise entered, into a computing system, database, or memory that is part of, under the control of, accessible by, or otherwise associated with the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented financial management system via a computer program product, and/or other form/mechanism of data transfer.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented tax preparation system, as discussed herein, and/or as known in the art at the time of filing, and/or as developed after the time of filing.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented tax preparation system in "hardcopy" and data representing the hardcopy information is entered into a computing system, database, or memory that is part of, under the control of, accessible by, or otherwise associated with, the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented tax preparation system as electronic data and the data is transferred, or otherwise entered, into a computing system, database, or memory that is part of, under the control of, accessible by, or otherwise associated with the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, a from a computing system implemented tax preparation system via a computer program product, and/or other form/mechanism of data transfer.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented accounting system as discussed herein, and/or as known in the art at the time of filing, and/or as developed after the time of filing.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented accounting system in "hardcopy" and data representing the hardcopy information is entered into a computing system, database, or memory that is part of, under the control of, accessible by, or otherwise associated with, the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from a computing system implemented accounting system as electronic data and the data is transferred, or otherwise entered, into a computing system, database, or memory that is part of, under the control of, accessible by, or otherwise associated with the process for streamlined payroll set up and compliant paycheck generation.

In one embodiment, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, a from a computing system implemented accounting system via a computer program product, and/or other form/mechanism of data transfer.

In other embodiments, at OBTAIN DATA INDICATING THE MINIMUM INFORMATION REQUIRED TO GENERATE A COMPLIANT PAYCHECK FOR AN EMPLOYEE OPERATION 305 the data indicating the minimum information required by the law to generate a compliant paycheck for an employee is obtained, and updated as needed, from any source of the data, as discussed herein, and/or as known at the time of filing, and/or as developed after the time of filing, by any means of data acquisition and/or data transfer as discussed herein, and/or as known at the time of filing, and/or as developed after the time of filing.

In one embodiment, the obtained data indicating the minimum information required by the law to generate a compliant paycheck for an employee is stored at OBTAIN DATA INDICATING THE MINIMUM INFORMATION REQUIRED TO GENERATE A COMPLIANT PAYCHECK FOR AN EMPLOYEE OPERATION 305 by any means of storing data as discussed herein, and/or as known at the time of filing, and/or as developed after the time of filing.

For instance, in one embodiment, at OBTAIN DATA INDICATING THE MINIMUM INFORMATION REQUIRED TO GENERATE A COMPLIANT PAYCHECK FOR AN EMPLOYEE OPERATION 305 the obtained data indicating the minimum information required by the law to generate a compliant paycheck for an employee is stored in whole, or in part, in a data storage means maintained by, accessible by, owned by, or otherwise related to: process for streamlined payroll set up and compliant paycheck generation 300 (FIG. 3), and/or a provider of process for streamlined payroll set up and compliant paycheck generation 300; a computing system implemented payroll system, such as computing system implemented payroll system 180 of FIGS. 1 and 2, and/or a provider of a computing system implemented payroll system; a computing system implemented data management system and/or a provider of a computing system implemented data management system; a computing system implemented financial management system, and/or a provider of a computing system implemented financial management system; a computing system implemented tax preparation system, and/or a provider of a computing system tax preparation system; a computing system implemented accounting management system, and/or a provider of a computing system implemented accounting system; or any other party, by any one of the numerous mechanisms known to those of skill in the art.

For instance, in one embodiment, the data, in whole, or in part, is stored in a memory system, such as user memory system 103 of user computing system 100 (FIGS. 1 and 2) in a computing system payroll system module, such as computing system payroll system 180 of FIG. 2, in a compliant paycheck data module, such as compliant paycheck data module 241.

Returning to FIG. 3, in other embodiments, at OBTAIN DATA INDICATING THE MINIMUM INFORMATION REQUIRED TO GENERATE A COMPLIANT PAYCHECK FOR AN EMPLOYEE OPERATION 305 the obtained data indicating the minimum information required by the law to generate a compliant paycheck for an employee is stored in whole, or in part, in any computing system memory, or server system memory, or database, such as database 170, of FIG. 1, or in a cache memory, such as cache memory 103A of FIG. 1, or in any main memory or mass memory, associated with a computing system, such as user computing system 100 described above. In one embodiment, the data, in whole, or in part, is stored in any computing system and/or server system, or other device, in another location, or on/in a computer readable medium, and/or any other computer program product. In one embodiment, the data, in whole, or in part, is stored on a webpage, in a web-based system, or on a public network such as the Internet.

Returning to FIG. 3, in various embodiments, at OBTAIN DATA INDICATING THE MINIMUM INFORMATION REQUIRED TO GENERATE A COMPLIANT PAYCHECK FOR AN EMPLOYEE OPERATION 305 the obtained data indicating the minimum information required by the law to generate a compliant paycheck for an employee is updated at periodic intervals, when the laws change, or in both instances.

In one embodiment, once the data indicating the minimum information required by the law to generate a compliant paycheck for an employee is determined and/or obtained, stored and updated as needed at OBTAIN DATA INDICATING THE MINIMUM INFORMATION REQUIRED TO GENERATE A COMPLIANT PAYCHECK FOR AN EMPLOYEE OPERATION 305, process flow proceeds to A USER ATTEMPTS TO GENERATE A PAYCHECK FOR A GIVEN EMPLOYEE OPERATION 307.

In one embodiment, at A USER ATTEMPTS TO GENERATE A PAYCHECK FOR A GIVEN EMPLOYEE OPERATION 307 an employer, an employee of the employer, or an agent for the employer, all of which are also referred to herein as a "user", attempts to generate a paycheck for a given employee, or to run a payroll, using the computing system implemented payroll system of PROVIDE A COMPUTING SYSTEM IMPLEMENTED PAYROLL SYSTEM OPERATION 303 and/or process for streamlined payroll set up and compliant paycheck generation 300.

In one embodiment, the user starts the paycheck generation procedure at A USER ATTEMPTS TO GENERATE A PAYCHECK FOR A GIVEN EMPLOYEE OPERATION 307 through a user interface screen displayed on a display device of a user computing system, such as display device 115 of FIGS. 1 and 2, of user computing system 100 of FIGS. 1 and 2. In one embodiment, at A USER ATTEMPTS TO GENERATE A PAYCHECK FOR A GIVEN EMPLOYEE OPERATION 307 (FIG. 3) the user starts the paycheck generation procedure at A USER ATTEMPTS TO GENERATE A PAYCHECK FOR A GIVEN EMPLOYEE OPERATION 307 through a user interface screen displayed on a display device of a user computing system using a user interface device, such as a keyboard 107, of FIG. 1 and FIG. 2, mouse 111 of FIG. 1 and FIG. 2, a touchpad, voice recognition software, or any other device and/or system capable of providing user input to a computing system, such as user computing system 100 of FIG. 1 and FIG. 2, and/or for translating user actions into computing system operations, whether available or known at the time of filing or as developed later.

Returning to FIG. 3, in one embodiment, the user starts the paycheck generation procedure at A USER ATTEMPTS TO GENERATE A PAYCHECK FOR A GIVEN EMPLOYEE OPERATION 307 by requesting a check for a given employee and providing no information beyond the amount of check desired and the name/ID of the given employee for whom the check is to be generated.

In one embodiment, the user starts the paycheck generation procedure at A USER ATTEMPTS TO GENERATE A PAYCHECK FOR A GIVEN EMPLOYEE OPERATION 307 by providing some additional data representing information regarding a given employee for whom a check is to be generated.

In one embodiment, the user starts the paycheck generation procedure at A USER ATTEMPTS TO GENERATE A PAYCHECK FOR A GIVEN EMPLOYEE OPERATION 307 by starting the process of running/creating a payroll.

In one embodiment, once an employer, a user, attempts to generate a paycheck for a given employee, or to run a payroll, using the computing system implemented payroll system of PROVIDE A COMPUTING SYSTEM IMPLEMENTED PAYROLL SYSTEM OPERATION 303 and/or process for streamlined payroll set up and compliant paycheck generation 300 at A USER ATTEMPTS TO GENERATE A PAYCHECK FOR A GIVEN EMPLOYEE OPERATION 307 process flow proceeds to ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309.

In one embodiment, at ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309 once a user attempts to generate a paycheck for a given employee, or run a payroll, at A USER ATTEMPTS TO GENERATE A PAYCHECK FOR A GIVEN EMPLOYEE OPERATION 307 the given employee's payroll record data from the computing system implemented payroll system of PROVIDE A COMPUTING SYSTEM IMPLEMENTED PAYROLL SYSTEM OPERATION 303 is analyzed/compared with the data indicating the minimum information required by the law to generate a compliant paycheck of OBTAIN DATA INDICATING THE MINIMUM INFORMATION REQUIRED TO GENERATE A COMPLIANT PAYCHECK FOR AN EMPLOYEE OPERATION 305 to determine if the given employee's payroll record data includes all of the minimum information required by the law to generate a compliant paycheck, or, in one embodiment, if the given employee's payroll record data includes at least enough data for process for streamlined payroll set up and compliant paycheck generation 300 to extrapolate, or fill-in, the minimum information required by the law to generate a compliant paycheck.

In one embodiment, at ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309 when an employer, an employee of the employer, or an agent for the employer, all of which are also referred to herein as a "user", attempts to generate a paycheck for a given employee using the computing system implemented payroll system, the given employee's payroll record data is obtained from the computing system implemented payroll system and one or more processors, such as CPU(s) 101 of FIGS. 1 and 2, associated with a computing system, such as user computing system 100 of FIGS. 1 and 2, analyze and/or compares the given employee's payroll record data with the data indicating the minimum information required by the law to generate a compliant paycheck.

Returning to FIG. 3, in one embodiment, at ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309, the analysis and/or comparison is performed to determine if the given employee's payroll record data, along with any additional data provided by the user at A USER ATTEMPTS TO GENERATE A PAYCHECK FOR A GIVEN EMPLOYEE OPERATION 307, includes all of the minimum information required by the law to generate a compliant paycheck.

Returning to FIG. 3, in one embodiment, at ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309, the analysis and/or comparison is performed to determine if the given employee's payroll record data, along with any additional data provided by the user at A USER ATTEMPTS TO GENERATE A PAYCHECK FOR A GIVEN EMPLOYEE OPERATION 307, includes at least enough data for the process for streamlined payroll set up and compliant paycheck generation to extrapolate and/or otherwise fill-in, the minimum information required by the law to generate a compliant paycheck.

For instance, in some embodiments, as little information as the employee's name, the employee's SSN or other tax identifier, the employee's state/city of residence, the employee's working location state/city, and the employee's wage type, i.e., salary, hourly etc., is all the information that is needed to generate a compliant paycheck. As a further example, if data indicating an employee's state of residence is obtained, then state tax withholding requirements, and various other state related requirements, can be determined. In another example, if only the employee's name, the employee's SSN or other tax identifier, the employee's state/city of residence, the employee's working location state/city, and the employee's wage type is known, all withholdings are defaulted to the maximums and remain at the default until more data is provided. Of note is the fact that this system provides the employee with incentive to provide additional information if his or her withholdings should actually be less than the maximum.

In contrast to prior art systems, in one embodiment, at ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309, process for streamlined payroll set up and compliant paycheck generation 300, analyzes searches for, compares, and requires, only the minimum data necessary to perform the task at hand, in this instance, to generate a compliant paycheck. As discussed in more detail below, using process for streamlined payroll set up and compliant paycheck generation 300, any other information/data can be provided at the user's discretion, as the information becomes available, and/or as time permits, and/or in any order, or priority, the user desires.

In one embodiment, once an employee's payroll record data from the computing system implemented payroll system of PROVIDE A COMPUTING SYSTEM IMPLEMENTED PAYROLL SYSTEM OPERATION 303 is analyzed/compared with the data indicating the minimum information required by the law to generate a compliant paycheck of OBTAIN DATA INDICATING THE MINIMUM INFORMATION REQUIRED TO GENERATE A COMPLIANT PAYCHECK FOR AN EMPLOYEE OPERATION 305 to determine if the given employee's payroll record data includes all of the minimum information required by the law to generate a compliant paycheck, or, in one embodiment, if the given employee's payroll record data includes at least enough data for the process for streamlined payroll set up and compliant paycheck generation to extrapolate, or fill-in, the minimum information required by the law to generate a compliant paycheck at ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309, process flow proceeds to IS ALL THE DATA NECESSARY TO GENERATE A COMPLIANT PAYCHECK CONTAINED IN THE PAYROLL RECORD ASSOCIATED WITH THE GIVEN EMPLOYEE IN THE COMPUTING SYSTEM IMPLEMENTED PAYROLL SYSTEM? OPERATION 311.

In one embodiment, at IS ALL THE DATA NECESSARY TO GENERATE A COMPLIANT PAYCHECK CONTAINED IN THE PAYROLL RECORD ASSOCIATED WITH THE GIVEN EMPLOYEE IN THE COMPUTING SYSTEM IMPLEMENTED PAYROLL SYSTEM?

OPERATION 311 based on the analysis of ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309 a determination is made as to whether the given employee's payroll record data in the computing system implemented payroll system of PROVIDE A COMPUTING SYSTEM IMPLEMENTED PAYROLL SYSTEM OPERATION 303 includes all of the minimum information required by the law to generate a compliant paycheck as determined at OBTAIN DATA INDICATING THE MINIMUM INFORMATION REQUIRED TO GENERATE A COMPLIANT PAYCHECK FOR AN EMPLOYEE OPERATION 305, or, in one embodiment, if the given employee's payroll record data includes at least enough data for process for streamlined payroll set up and compliant paycheck generation 300 to extrapolate, or fill-in, the minimum information required by the law to generate a compliant paycheck.

In one embodiment, if at IS ALL THE DATA NECESSARY TO GENERATE A COMPLIANT PAYCHECK CONTAINED IN THE PAYROLL RECORD ASSOCIATED WITH THE GIVEN EMPLOYEE IN THE COMPUTING SYSTEM IMPLEMENTED PAYROLL SYSTEM? OPERATION 311 based on the analysis of ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309 a determination is made that the given employee's payroll record data in the computing system implemented payroll system of PROVIDE A COMPUTING SYSTEM IMPLEMENTED PAYROLL SYSTEM OPERATION 303 does include all of the minimum information required by the law to generate a compliant paycheck as determined at OBTAIN DATA INDICATING THE MINIMUM INFORMATION REQUIRED TO GENERATE A COMPLIANT PAYCHECK FOR AN EMPLOYEE OPERATION 305, or, in one embodiment, if the given employee's payroll record data does include at least enough data for process for streamlined payroll set up and compliant paycheck generation 300 to extrapolate, or fill-in, the minimum information required by the law to generate a compliant paycheck, then process flow proceeds directly to MARK THE PAYROLL RECORD ASSOCIATED WITH THE GIVEN EMPLOYEE IN THE COMPUTING SYSTEM IMPLEMENTED PAYROLL SYSTEM AS BEING SUFFICIENTLY COMPLETE TO GENERATE COMPLIANT PAYCHECKS FOR THE GIVEN EMPLOYEE OPERATION 331, as discussed below.

As noted above, using process for streamlined payroll set up and compliant paycheck generation 300, any employee information/data other than the minimum information required by the law to generate a compliant paycheck, or enough data to extrapolate the minimum information required by the law to generate a compliant paycheck, can be provided at the user's discretion, as the information becomes available, and/or as time permits, and/or in any order, or priority, the user desires.

If, on the other hand, at IS ALL THE DATA NECESSARY TO GENERATE A COMPLIANT PAYCHECK CONTAINED IN THE PAYROLL RECORD ASSOCIATED WITH THE GIVEN EMPLOYEE IN THE COMPUTING SYSTEM IMPLEMENTED PAYROLL SYSTEM? OPERATION 311 based on the analysis of ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309 a determination is made that the given employee's payroll record data in the computing system implemented payroll system of PROVIDE A COMPUTING SYSTEM IMPLEMENTED PAYROLL SYSTEM OPERATION 303 does not include all of the minimum information required by the law to generate a compliant paycheck as determined at OBTAIN DATA INDICATING THE MINIMUM INFORMATION REQUIRED TO GENERATE A COMPLIANT PAYCHECK FOR AN EMPLOYEE OPERATION 305, or, in one embodiment, if the given employee's payroll record data does not include at least enough data for process for streamlined payroll set up and compliant paycheck generation 300 to extrapolate, or fill-in, the minimum information required by the law to generate a compliant paycheck, then process flow proceeds to REQUEST THE MINIMUM NECESSARY INFORMATION FROM THE USER OPERATION 320.

In one embodiment, at REQUEST THE MINIMUM NECESSARY INFORMATION FROM THE USER OPERATION 320 the user is asked to provide at least enough missing data for process for streamlined payroll set up and compliant paycheck generation 300 to extrapolate the minimum information required by the law to generate a compliant paycheck of OBTAIN DATA INDICATING THE MINIMUM INFORMATION REQUIRED TO GENERATE A COMPLIANT PAYCHECK FOR AN EMPLOYEE OPERATION 305.

In one embodiment, at REQUEST THE MINIMUM NECESSARY INFORMATION FROM THE USER OPERATION 320 the user is asked to provide the minimum required information required by the law to generate a compliant paycheck of OBTAIN DATA INDICATING THE MINIMUM INFORMATION REQUIRED TO GENERATE A COMPLIANT PAYCHECK FOR AN EMPLOYEE OPERATION 305, and/or at least enough missing data for the process for streamlined payroll set up and compliant paycheck generation to extrapolate the minimum information required by the law to generate a compliant paycheck required by the law to generate a compliant paycheck of OBTAIN DATA INDICATING THE MINIMUM INFORMATION REQUIRED TO GENERATE A COMPLIANT PAYCHECK FOR AN EMPLOYEE OPERATION 305, via a user interface screen on a display device associated with a computing system, such as display device 115 of user computing system 100 of FIGS. 1 and 2.

Returning to FIG. 3, in one embodiment, at REQUEST THE MINIMUM NECESSARY INFORMATION FROM THE USER OPERATION 320 the user is asked to provide the minimum required information, and/or at least enough missing data for the process for streamlined payroll set up and compliant paycheck generation to extrapolate the minimum information required by the law to generate a compliant paycheck, using a user interface device such as, but not limited to, a keyboard, such as keyboard 107 of FIGS. 1 and 2, a mouse, such as mouse 111 of FIGS. 1 and 2, a touchpad, voice recognition software, or any other device and/or system capable of providing user input to a computing system and/or for translating user actions into computing system operations, whether available or known at the time of filing or as developed later.

Returning to FIG. 3, in contrast to prior art systems, using process for streamlined payroll set up and compliant paycheck generation 300, at REQUEST THE MINIMUM NECESSARY INFORMATION FROM THE USER OPERATION 320 the user is asked to provide only the minimum information required by the law to generate a compliant paycheck.

In addition, in one embodiment, using process for streamlined payroll set up and compliant paycheck generation 300, at REQUEST THE MINIMUM NECESSARY INFORMATION FROM THE USER OPERATION 320 the minimum information required by the law to generate a compliant paycheck is requested only when the data is actually needed.

In addition, in one embodiment, using process for streamlined payroll set up and compliant paycheck generation 300, at REQUEST THE MINIMUM NECESSARY INFORMATION FROM THE USER OPERATION 320, the minimum information required by the law to generate a compliant paycheck can be provided by the user in any order, or priority, the user desires.

In addition, using process for streamlined payroll set up and compliant paycheck generation 300, at REQUEST THE MINIMUM NECESSARY INFORMATION FROM THE USER OPERATION 320, any employee information/data other than the minimum information required by the law to generate a compliant paycheck, or enough data to extrapolate the minimum information required by the law to generate a compliant paycheck, can be provided at the user's discretion, as the information becomes available, and/or as time permits, and/or in any order, or priority, the user desires.

In one embodiment, once the user is asked to provide at least enough missing data for process for streamlined payroll set up and compliant paycheck generation 300 to extrapolate the minimum information required by the law to generate a compliant paycheck of OBTAIN DATA INDICATING THE MINIMUM INFORMATION REQUIRED TO GENERATE A COMPLIANT PAYCHECK FOR AN EMPLOYEE OPERATION 305 at REQUEST THE MINIMUM NECESSARY INFORMATION FROM THE USER OPERATION 320, process flow proceeds to RECEIVE THE MINIMUM NECESSARY INFORMATION FROM THE USER OPERATION 322.

In one embodiment, at RECEIVE THE MINIMUM NECESSARY INFORMATION FROM THE USER OPERATION 322 the data requested at REQUEST THE MINIMUM NECESSARY INFORMATION FROM THE USER OPERATION 320 is entered, and/or otherwise obtained by the computing system impended payroll system of PROVIDE A COMPUTING SYSTEM IMPLEMENTED PAYROLL SYSTEM OPERATION 303 and/or process for streamlined payroll set up and compliant paycheck generation 300 and is added to the employees payroll record of the computing system impended payroll system of PROVIDE A COMPUTING SYSTEM IMPLEMENTED PAYROLL SYSTEM OPERATION 303.

In one embodiment, at RECEIVE THE MINIMUM NECESSARY INFORMATION FROM THE USER OPERATION 322 the data requested at REQUEST THE MINIMUM NECESSARY INFORMATION FROM THE USER OPERATION 320 is entered by the user using a user interface device and a user interface screen displayed on a display device of a computing system and the data is stored in an employee payroll records module, such as employee payroll records module 243 of FIG. 2, of a computing system implemented payroll system, such as computing system implemented payroll system 180 of FIGS. 1 and 2.

Returning to FIG. 3, in one embodiment, once the data requested at REQUEST THE MINIMUM NECESSARY INFORMATION FROM THE USER OPERATION 320 is entered, and/or otherwise obtained by the computing system impended payroll system of PROVIDE A COMPUTING SYSTEM IMPLEMENTED PAYROLL SYSTEM OPERATION 303 and/or process for streamlined payroll set up and compliant paycheck generation 300 and is added to the employees payroll record of the computing system impended payroll system of PROVIDE A COMPUTING SYSTEM IMPLEMENTED PAYROLL SYSTEM OPERATION 303 at RECEIVE THE MINIMUM NECESSARY INFORMATION FROM THE USER OPERATION 322 process flow proceeds to INFER ALL OTHER DATA NECESSARY TO GENERATE A COMPLIANT PAYCHECK FOR THE MINIMUM NECESSARY INFORMATION RECEIVED FROM THE USER OPERATION 324.

In one embodiment, at INFER ALL OTHER DATA NECESSARY TO GENERATE A COMPLIANT PAYCHECK FOR THE MINIMUM NECESSARY INFORMATION RECEIVED FROM THE USER OPERATION 324 any of the data of OBTAIN DATA INDICATING THE MINIMUM INFORMATION REQUIRED TO GENERATE A COMPLIANT PAYCHECK FOR AN EMPLOYEE OPERATION 305 that must be extrapolated and/or filled in from the data of RECEIVE THE MINIMUM NECESSARY INFORMATION FROM THE USER OPERATION 322 is inferred and/or extrapolated using one or more processors, such as CPU(s) 101 of FIGS. 1 and 2, and instructions and/or data from an extrapolation module of a memory, such as extrapolation module 245 of computing system implemented payroll system 180, of user memory 103, of user computing system 100, of FIGS. 1 and 2.

In one embodiment, at INFER ALL OTHER DATA NECESSARY TO GENERATE A COMPLIANT PAYCHECK FOR THE MINIMUM NECESSARY INFORMATION RECEIVED FROM THE USER OPERATION 324 any of the data of OBTAIN DATA INDICATING THE MINIMUM INFORMATION REQUIRED TO GENERATE A COMPLIANT PAYCHECK FOR AN EMPLOYEE OPERATION 305 that must be extrapolated and/or filled in from the data of RECEIVE THE MINIMUM NECESSARY INFORMATION FROM THE USER OPERATION 322 is inferred and/or extrapolated and the inferred and/or extrapolated data is then is added to the employees payroll record of the computing system impended payroll system of PROVIDE A COMPUTING SYSTEM IMPLEMENTED PAYROLL SYSTEM OPERATION 303.

In one embodiment, once any of the data of OBTAIN DATA INDICATING THE MINIMUM INFORMATION REQUIRED TO GENERATE A COMPLIANT PAYCHECK FOR AN EMPLOYEE OPERATION 305 that must be extrapolated and/or filled in from the data of RECEIVE THE MINIMUM NECESSARY INFORMATION FROM THE USER OPERATION 322 is inferred and/or extrapolated and the inferred and/or extrapolated data is then is added to the employee's payroll record of the computing system impended payroll system of PROVIDE A COMPUTING SYSTEM IMPLEMENTED PAYROLL SYSTEM OPERATION 303 at INFER ALL OTHER DATA NECESSARY TO GENERATE A COMPLIANT PAYCHECK FOR THE MINIMUM NECESSARY INFORMATION RECEIVED FROM THE USER OPERATION 324 process flow proceeds to MARK THE PAYROLL RECORD ASSOCIATED WITH THE GIVEN EMPLOYEE IN THE COMPUTING SYSTEM IMPLEMENTED PAYROLL SYSTEM AS BEING SUFFICIENTLY COMPLETE TO GENERATE COMPLIANT PAYCHECKS FOR THE GIVEN EMPLOYEE OPERATION 331.

In one embodiment, at MARK THE PAYROLL RECORD ASSOCIATED WITH THE GIVEN EMPLOYEE IN THE COMPUTING SYSTEM IMPLEMENTED PAYROLL SYSTEM AS BEING SUFFICIENTLY COMPLETE TO GENERATE COMPLIANT PAYCHECKS FOR THE GIVEN EMPLOYEE OPERATION 331 the given employee's payroll record is marked as having the compliant paycheck data required of OBTAIN DATA INDICATING THE MINIMUM INFORMATION REQUIRED TO GENERATE A COMPLIANT PAYCHECK FOR AN EMPLOYEE OPERATION 305.

In one embodiment, once MARK THE PAYROLL RECORD ASSOCIATED WITH THE GIVEN EMPLOYEE IN THE COMPUTING SYSTEM IMPLEMENTED PAYROLL SYSTEM AS BEING SUFFICIENTLY COMPLETE TO GENERATE COMPLIANT PAYCHECKS FOR THE GIVEN EMPLOYEE OPERATION 331 is reached from either IS ALL THE DATA NECESSARY TO GENERATE A COMPLIANT PAYCHECK CONTAINED IN THE PAYROLL RECORD ASSOCIATED WITH THE GIVEN EMPLOYEE IN THE COMPUTING SYSTEM IMPLEMENTED PAYROLL SYSTEM? OPERATION 311 directly, or from INFER ALL OTHER DATA NECESSARY TO GENERATE A COMPLIANT PAYCHECK FOR THE MINIMUM NECESSARY INFORMATION RECEIVED FROM THE USER OPERATION 324, the given employee's payroll record in the computing system implemented payroll system of PROVIDE A COMPUTING SYSTEM IMPLEMENTED PAYROLL SYSTEM OPERATION 303, such as computing system implemented payroll system 180 of FIGS. 1 and 2, is marked as having the compliant paycheck data required of OBTAIN DATA INDICATING THE MINIMUM INFORMATION REQUIRED TO GENERATE A COMPLIANT PAYCHECK FOR AN EMPLOYEE OPERATION 305 by any means of marking and/or flagging a file as discussed herein, and/or as known in the art at the time of filing, and/or as developed after the time of filing.

In one embodiment, once an employee's payroll record is marked as having the compliant paycheck data required of OBTAIN DATA INDICATING THE MINIMUM INFORMATION REQUIRED TO GENERATE A COMPLIANT PAYCHECK FOR AN EMPLOYEE OPERATION 305, then in subsequent applications of process for streamlined payroll set up and compliant paycheck generation 300, at ANALYZE CURRENT PAYROLL DATA IN A PAYROLL RECORD ASSOCIATED WITH THE GIVEN EMPLOYEE IN THE COMPUTING SYSTEM IMPLEMENTED PAYROLL SYSTEM IN LIGHT OF THE DATA INDICATING MINIMUM INFORMATION REQUIRED TO GENERATE A COMPLIANT PAYCHECK FOR AN EMPLOYEE OPERATION 309, the marked employee's payroll record is skipped and at IS ALL THE DATA NECESSARY TO GENERATE A COMPLIANT PAYCHECK CONTAINED IN THE PAYROLL RECORD ASSOCIATED WITH THE GIVEN EMPLOYEE IN THE COMPUTING SYSTEM IMPLEMENTED PAYROLL SYSTEM? OPERATION 311 the marked employee's payroll record is automatically determined to include all of the necessary data to meet the requirements of OBTAIN DATA INDICATING THE MINIMUM INFORMATION REQUIRED TO GENERATE A COMPLIANT PAYCHECK FOR AN EMPLOYEE OPERATION 305.

In one embodiment, once the given employee's payroll record is marked as having the compliant paycheck data required of OBTAIN DATA INDICATING THE MINIMUM INFORMATION REQUIRED TO GENERATE A COMPLIANT PAYCHECK FOR AN EMPLOYEE OPERATION 305 at MARK THE PAYROLL RECORD ASSOCIATED WITH THE GIVEN EMPLOYEE IN THE COMPUTING SYSTEM IMPLEMENTED PAYROLL SYSTEM AS BEING SUFFICIENTLY COMPLETE TO GENERATE COMPLIANT PAYCHECKS FOR THE GIVEN EMPLOYEE OPERATION 331 process flow proceeds to GENERATE THE REQUESTED PAYCHECK FOR THE GIVEN EMPLOYEE OPERATION 333.

In one embodiment, at GENERATE THE REQUESTED PAYCHECK FOR THE GIVEN EMPLOYEE OPERATION 333 the requested paycheck of A USER ATTEMPTS TO GENERATE A PAYCHECK FOR A GIVEN EMPLOYEE OPERATION 307 is then generated through the computing system implemented payroll system of PROVIDE A COMPUTING SYSTEM IMPLEMENTED PAYROLL SYSTEM OPERATION 303.

In one embodiment, once the requested paycheck of A USER ATTEMPTS TO GENERATE A PAYCHECK FOR A GIVEN EMPLOYEE OPERATION 307 is generated through the computing system implemented payroll system of PROVIDE A COMPUTING SYSTEM IMPLEMENTED PAYROLL SYSTEM OPERATION 303 at GENERATE THE REQUESTED PAYCHECK FOR THE GIVEN EMPLOYEE OPERATION 333 process flow proceeds to EXIT OPERATION 350. In one embodiment, at EXIT OPERATION 350, process for streamlined payroll set up and compliant paycheck generation 300 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for streamlined payroll set up and compliant paycheck generation 300, only the minimum information required by the law to generate a compliant paycheck is requested of a user and required in order for the user to generate a paycheck. In addition, using process for streamlined payroll set up and compliant paycheck generation 300, the minimum information required by the law to generate a compliant paycheck is requested only when the data is actually needed. In addition, using process for streamlined payroll set up and compliant paycheck generation 300, the minimum information required by the law to generate a compliant paycheck can be provided by the user in any order, or priority, the user desires. In addition, using process for streamlined payroll set up and compliant paycheck generation 300, any employee information/data other than the minimum information required by the law to generate a compliant paycheck, or enough data to extrapolate the minimum information required by the law to generate a compliant paycheck, can be provided at the user's discretion, as the information becomes available, and/or as time permits, and/or in any order, or priority, the user desires. Consequently, using process for streamlined payroll set up and compliant paycheck generation 300, a user can generate a legally compliant paycheck without the unnecessary data entry burden, and corresponding time delay, required by currently available computing system implemented payroll systems. Therefore, using process for streamlined payroll set up and compliant paycheck generation 300, paychecks can be generated, employee's can get paid in minimum time and with minimum effort.

In addition, using process for streamlined payroll set up and compliant paycheck generation 300, when time does permit, and/or the information becomes available, the more detailed information can be entered in any order, or priority, the user desires, and then "exact paychecks" of amounts calculated based on exactly correct deductions and other variable items, rather than a compliant paycheck that has been calculated to conform to the legally required deductions and other variable items, can be generated using process for streamlined payroll set up and compliant paycheck generation 300.

In one embodiment, the process discussed above is repeated for each employee in order to "set up a payroll", i.e., to obtain the necessary data in order to run a payroll and/or generally set-up an operating payroll system.

Figure 4:
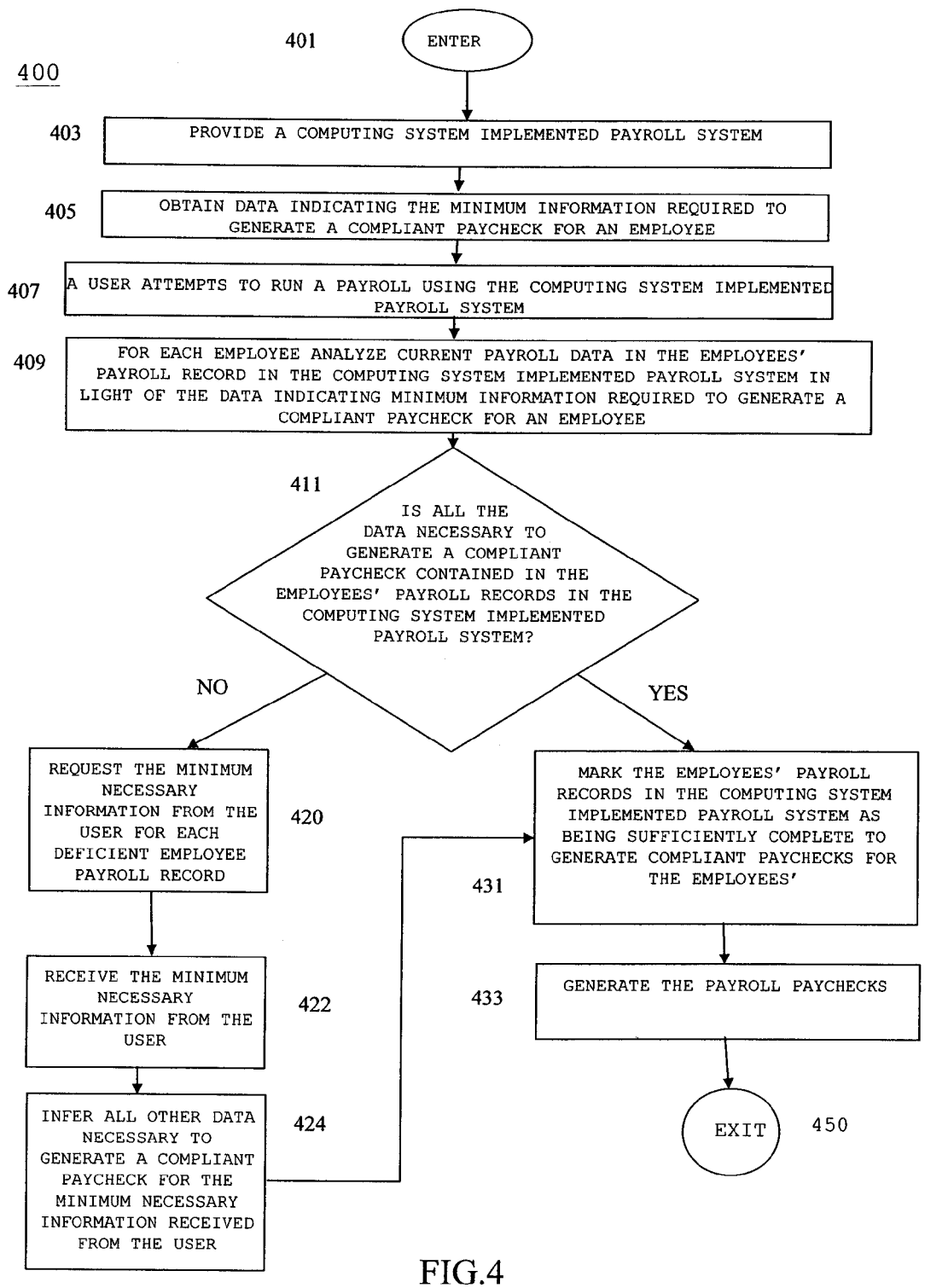
FIG. 4 is an exemplary flow chart illustrating one embodiment of a process for streamlined payroll set up and compliant paycheck generation.

FIG. 4 is a flow chart depicting a process for streamlined payroll set up and compliant paycheck generation 400 in accordance with one embodiment. Process for streamlined payroll set up and compliant paycheck generation 400 is similar to process for streamlined payroll set up and compliant paycheck generation 300 except that with process for streamlined payroll set up and compliant paycheck generation 400 an entire payroll for multiple employees is set up and/or multiple paychecks are potentially generated. Consequently, the discussion above with respect to process for streamlined payroll set up and compliant paycheck generation 300 and FIG. 3 is equally applicable to corresponding operations of process for streamlined payroll set up and compliant paycheck generation 400 of FIG. 4.

In FIG. 4, certain aspects of one embodiment include process steps and/or operations and/or instructions described herein for illustrative purposes in a particular order and/or grouping. However, the particular order and/or grouping shown in FIG. 4 are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions shown in FIG. 4 do not limit the scope of the invention as claimed below.

Using process for streamlined payroll set up and compliant paycheck generation 400, only the minimum information required by the law to set up and/or run a payroll is requested of a user and required in order for the user to set up and/or run a payroll. In addition, using process for streamlined payroll set up and compliant paycheck generation 400, the minimum information required by the law to set up and/or run a payroll is requested only when the data is actually needed. In addition, using process for streamlined payroll set up and compliant paycheck generation 400, the minimum information required by the law to set up and/or run a payroll can be provided by the user in any order, or priority, the user desires. In addition, using process for streamlined payroll set up and compliant paycheck generation 400, any employee information/data other than the minimum information required by the law to generate a compliant paycheck, or enough data to extrapolate the minimum information required by the law to generate a compliant paycheck, can be provided at the user's discretion, as the information becomes available, and/or as time permits, and/or in any order, or priority, the user desires. Consequently, using process for streamlined payroll set up and compliant paycheck generation 400, a user can set up and/or run a legally compliant payroll, without the unnecessary data entry burden, and corresponding time delay, required by currently available computing system implemented payroll systems. Therefore, using process for streamlined payroll set up and compliant paycheck generation 400, payrolls can be set up and/or run and employee's can get paid, in minimum time and with minimum effort.

In addition, using process for streamlined payroll set up and compliant paycheck generation 400, when time does permit, and/or the information becomes available, the more detailed information can be entered in any order, or priority, the user desires, and then "exact paychecks" of amounts calculated based on exactly correct deductions and other variable items, rather than a compliant paycheck that has been calculated to conform to the legally required deductions and other variable items, can be generated using process for streamlined payroll set up and compliant paycheck generation 400.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "aggregating", "analyzing", "defining", "storing", "saving", "displaying", "generating", "providing", "processing", "receiving", "requesting", "marking", "extrapolating", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for streamlined payroll set up and compliant paycheck generation comprising:

providing a computing system implemented payroll system, the computing system implemented payroll system being implemented, at least in part, by one or more processors associated with a computing system, the computing system implemented payroll system being used for creating and maintaining a payroll record for one or more employees, each employee payroll record including currently available payroll data associated with the employee, the computing system implemented payroll system being accessible by a user;

obtaining data, from a third party computing system, indicating the minimum information required by the law to generate a compliant paycheck for an employee, wherein the third party is a government entity;

storing the data indicating the minimum information required by the law to generate a compliant paycheck for an employee in a data storage means, the data storage means being accessible by a computing system associated with the computing system implemented process for streamlined payroll set up and compliant paycheck generation;

the user attempting to use the computing system implemented payroll system to generate a given paycheck for a given employee;

using at least one processor associated with a computing system to analyze the currently available payroll data associated with the given employee in the given employee's payroll record and the data indicating the minimum information required by the law to generate a compliant paycheck for an employee;

determining, through the analysis, that the currently available payroll data associated with the given employee in the given employee's payroll record does not include all of the data representing at least the minimum information required by the law to generate a compliant paycheck for the given employee;

requesting the user to provide the missing data representing the minimum information required by the law to generate a compliant paycheck for the given employee;

receiving the missing data representing the minimum information required by the law to generate a compliant paycheck for the given employee from the user;

adding the received missing data representing the minimum information required by the law to generate a compliant paycheck for the given employee from the user to the payroll data associated with the given employee in the given employee's payroll record;

marking the given employee's payroll record as including data representing the minimum information required by the law to generate a compliant paycheck for the given employee; and generating the given paycheck for the given employee.

2. The computing system implemented process for streamlined payroll set up and compliant paycheck generation of claim 1, wherein;

at least part of the data indicating the minimum information required by the law to generate a compliant paycheck for an employee is obtained from one or more sources of data indicating the minimum information required by the law to generate a compliant paycheck for an employee selected from the group of sources of data indicating the minimum information required by the law to generate a compliant paycheck for an employee consisting of:
- a computing system implemented data management system;
- a computing system implemented financial management system;
- a computing system implemented tax preparation system; and
- a computing system implemented accounting system.

3. A computing system implemented process for streamlined payroll set up and compliant paycheck generation comprising:
- providing a computing system implemented payroll system, the computing system implemented payroll system being implemented, at least in part, by one or more processors associated with a computing system, the computing system implemented payroll system being used for creating and maintaining a payroll record for one or more employees, each employee payroll record including currently available payroll data associated with the employee, the computing system implemented payroll system being accessible by a user;
- obtaining data, from a third party computing system, indicating the minimum information required by the law to generate a compliant paycheck for an employee, wherein the third party is a government entity;
- storing the data indicating the minimum information required by the law to generate a compliant paycheck for an employee in a data storage means, the data storage means being accessible by a computing system associated with the computing system implemented process for streamlined payroll set up and compliant paycheck generation;
- the user attempting to use the computing system implemented payroll system to generate a payroll for the one or more employees;
- using at least one processor associated with a computing system to analyze the currently available payroll data associated with the one or more employees in the one or more employees' payroll records and the data indicating the minimum information required by the law to generate a compliant paycheck for an employee;
- determining, through the analysis, that the currently available payroll data associated with the one or more employees in the one or more employees' payroll records does not include all of the data representing at least the minimum information required by the law to generate a compliant paycheck for the one or more employees;
- requesting the user to provide the missing data representing the minimum information required by the law to generate a compliant paycheck for the one or more employees;
- receiving the missing data representing the minimum information required by the law to generate a compliant paycheck for the one or more employees from the user;
- adding the received missing data representing the minimum information required by the law to generate a compliant paycheck for the one or more employees from the user to the payroll data associated with the one or more employees in the respective employee's payroll record;
- marking the one or more employees' payroll records as including data representing the minimum information required by the law to generate a compliant paycheck for the one or more employees; and
- generating the payroll for the one or more employees.

4. The computing system implemented process for streamlined payroll set up and compliant paycheck generation of claim 3, wherein;
- at least part of the data indicating the minimum information required by the law to generate a compliant paycheck for an employee is obtained from one or more sources of data indicating the minimum information required by the law to generate a compliant paycheck for an employee selected from the group of sources of data indicating the minimum information required by the law to generate a compliant paycheck for an employee consisting of:
- a computing system implemented data management system;
- a computing system implemented financial management system;
- a computing system implemented tax preparation system; and
- a computing system implemented accounting system.

5. A computer program product for streamlined payroll set up and compliant paycheck generation comprising:
- a computer readable medium;
- and computer program code, encoded on the computer readable medium, comprising computer readable instructions executed on at least one processor for:
- providing a computing system implemented payroll system, the computing system implemented payroll system being used for creating and maintaining a payroll record for one or more employees, each employee payroll record including currently available payroll data associated with the employee, the computing system implemented payroll system being accessible by a user;
- obtaining data, from a third party computing system, indicating the minimum information required by the law to generate a compliant paycheck for an employee, wherein the third party is a government entity;
- storing the data indicating the minimum information required by the law to generate a compliant paycheck for an employee in a data storage means, the data storage means being accessible by a computing system associated with the computing system implemented process for streamlined payroll set up and compliant paycheck generation;
- allowing a user to attempt to use the computing system implemented payroll system to generate a given paycheck for a given employee;
- analyzing the currently available payroll data associated with the given employee in the given employee's payroll record and the data indicating the minimum information required by the law to generate a compliant paycheck for an employee;
- determining, through the analysis, that the currently available payroll data associated with the given employee in the given employee's payroll record does not include all of the data representing at least the minimum information required by the law to generate a compliant paycheck for the given employee;
- requesting the user to provide the missing data representing the minimum information required by the law to generate a compliant paycheck for the given employee;
- receiving the missing data representing the minimum information required by the law to generate a compliant paycheck for the given employee from the user;
- adding the received missing data representing the minimum information required by the law to generate a compliant paycheck for the given employee from the user to the payroll data associated with the given employee in the given employee's payroll record;

marking the given employee's payroll record as including data representing the minimum information required by the law to generate a compliant paycheck for the given employee; and generating the given paycheck for the given employee.

6. The computer program product for streamlined payroll set up and compliant paycheck generation of claim 5, wherein;

at least part of the data indicating the minimum information required by the law to generate a compliant paycheck for an employee is obtained from one or more sources of data indicating the minimum information required by the law to generate a compliant paycheck for an employee selected from the group of sources of data indicating the minimum information required by the law to generate a compliant paycheck for an employee consisting of:

a computing system implemented data management system;

a computing system implemented financial management system;

a computing system implemented tax preparation system; and a computing system implemented accounting system.

7. A system for streamlined payroll set up and compliant paycheck generation comprising:

a user computing system;

a computing system implemented payroll system, the computing system implemented payroll system being implemented, at least in part, by one or more processors associated with the user computing system; and the one or more processors associated with the user computing system executing at least part of a process for streamlined payroll set up and compliant paycheck generation, the process for streamlined payroll set up and compliant paycheck generation comprising:

using the computing system implemented payroll system for creating and maintaining a payroll record for one or more employees, each employee payroll record including currently available payroll data associated with the employee, the computing system implemented payroll system being accessible by a user;

obtaining data, from a third party computing system, indicating the minimum information required by the law to generate a compliant paycheck for an employee, wherein the third party is a government entity;

storing the data indicating the minimum information required by the law to generate a compliant paycheck for an employee in a data storage means, the data storage means being accessible by a computing system associated with the computing system implemented process for streamlined payroll set up and compliant paycheck generation;

the user attempting to use the computing system implemented payroll system to generate a given paycheck for a given employee;

using at least one processor of the one or more processors associated with the user computing system to analyze the currently available payroll data associated with the given employee in the given employee's payroll record and the data indicating the minimum information required by the law to generate a compliant paycheck for an employee;

determining, through the analysis, that the currently available payroll data associated with the given employee in the given employee's payroll record does not include all of the data representing at least the minimum information required by the law to generate a compliant paycheck for the given employee;

requesting the user to provide the missing data representing the minimum information required by the law to generate a compliant paycheck for the given employee;

receiving the missing data representing the minimum information required by the law to generate a compliant paycheck for the given employee from the user;

adding the received missing data representing the minimum information required by the law to generate a compliant paycheck for the given employee from the user to the payroll data associated with the given employee in the given employee's payroll record;

marking the given employee's payroll record as including data representing the minimum information required by the law to generate a compliant paycheck for the given employee; and generating the given paycheck for the given employee.

8. The system for streamlined payroll set up and compliant paycheck generation of claim 7, wherein;

at least part of the data indicating the minimum information required by the law to generate a compliant paycheck for an employee is obtained from one or more sources of data indicating the minimum information required by the law to generate a compliant paycheck for an employee selected from the group of sources of data indicating the minimum information required by the law to generate a compliant paycheck for an employee consisting of:

a computing system implemented data management system;

a computing system implemented financial management system;

a computing system implemented tax preparation system; and a computing system implemented accounting system.

* * * * *